Nov. 30, 1965     L. M. FRANCIS     3,220,746
VEHICLE WHEEL AND AXLE SUSPENSION
Filed Aug. 20, 1963
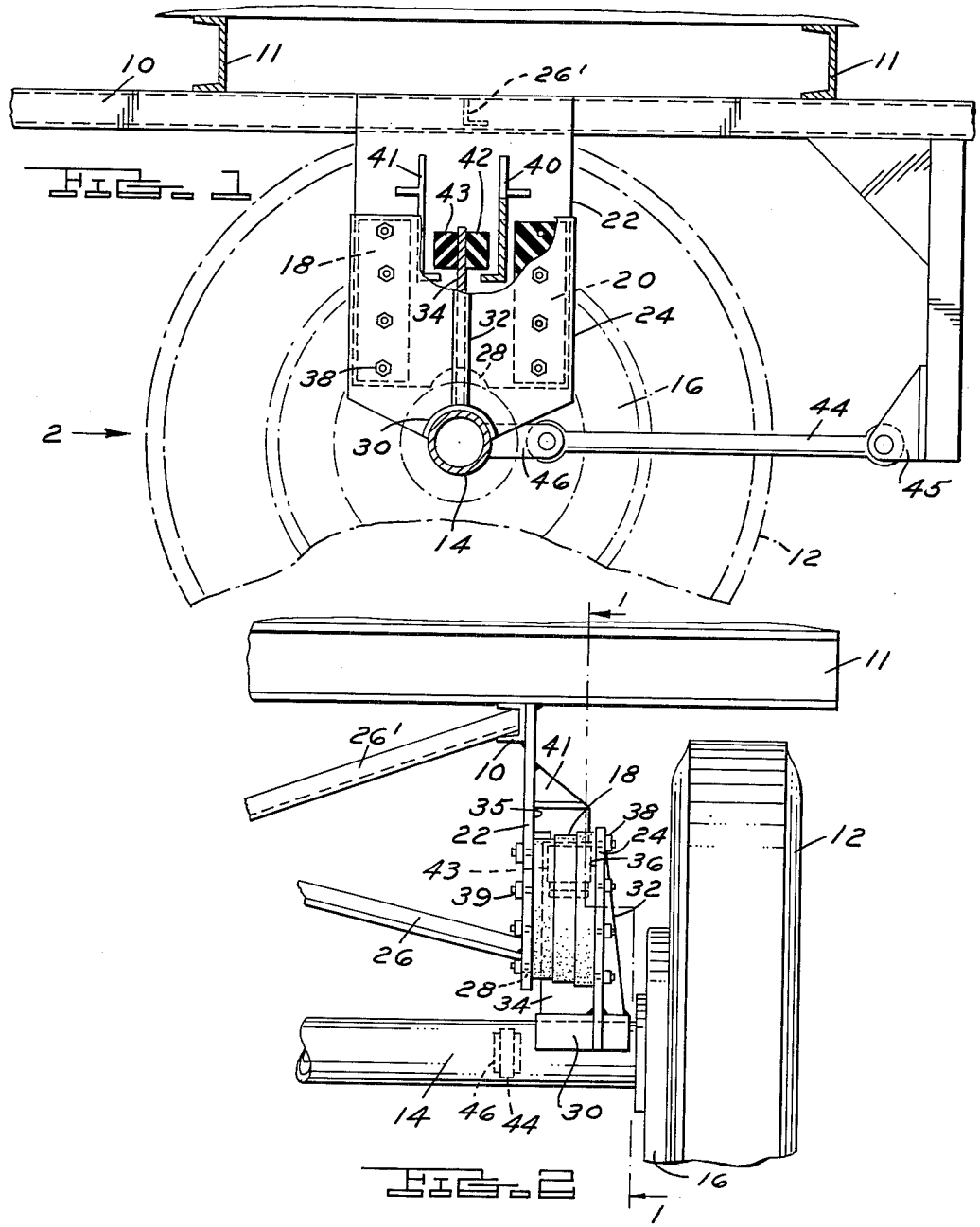
INVENTOR.
LYNN M. FRANCIS
BY
Farley Forster & Farley
ATTORNEYS 3,220,746
VEHICLE WHEEL AND AXLE SUSPENSION
Lynn M. Francis, 21611 Raymond Ave.,
St. Clair Shores, Mich.
Filed Aug. 20, 1963, Ser. No. 303,329
2 Claims. (Cl. 280—124)

This invention relates to an improved construction for resiliently suspending the wheel and axle of a vehicle from the vehicle frame, the construction being of the type wherein rubber blocks are employed as spring members.

The overall object of the invention is to provide a simplified construction employing a minimum number of rubber blocks for a given load condition and which can be used to suspend axles of various types including simple trailing axles, trailing axles equipped with brakes, and live axles through which a wheel is driven.

According to the invention, a suspension for connecting a wheel and axle to a vehicle frame basically comprises a resilient rubber block, a pair of block supporting members each having a block mounting face, means rigidly securing one of the block supporting members to the vehicle frame and the other block supporting member to the axle with the block mounting faces of the two members positioned in spaced relation longitudinally of the axle adjacent the wheel and extending in parallel relation transversely to the axle, and means securing the rubber block to the block supporting members between the mounting faces thereof whereby the rubber block acts in compression to position the axle transversely of the frame and acts in shear to absorb vehicle load and vertical relative movement between the axle and frame.

Thus in the present construction the rubber blocks are employed as axle locating members as well as springs, the blocks being mounted so as to make use of their relative stiffness in compression and elasticity in shear. Where a brake is employed between the wheel and axle, or where the wheel is driven, a rotational reaction is imposed on the axle together with a tendency for the axle to move longitudinally of the frame. The present construction provides means for independently absorbing these reactions so they will not be imposed on the rubber block and increase the shear loading thereof. For absorbing rotational reaction an arm is secured to the axle extending redially thereof, reaction means are carried by the frame and located adjacent the outer portion of the arm whereby rotation of the axle is limited by engagement between the arm and reaction means. For longitudinal placement of the axle, a link is pivotally connected between the axle and frame extending generally transversely of the axle, and preferably the link is secured to a crank carried by the axle so that both the combination of link and aforementioned arm act to limit rotational movement of the axle.

Other features and advantages of the invention will be apparent from the following description of the representative construction disclosed in the accompanying drawings in which:

FIGURE 1 is a sectional side elevation taken as indicated by the line 1—1 of FIG. 2 showing a wheel and axles suspended from a vehicle frame by the construction of the invention; and FIGURE 2 is an end elevation of the structure shown in FIG. 1 taken as indicated by the arrow 2 thereon.

In FIGS. 1 and 2, longitudinal and transverse vehicle frame members are shown by the members 10 and 11 respectively. A vehicle wheel 12 is mounted on an axle 14 equipped with a brake 16.

The suspension includes a pair of rubber blocks 18 and 20 and a pair of block supporting members 22 and 24. The block supporting member 22 is rigidly secured to the frame member 10 and suitably braced to the frame as indicated by the members 26 and 26', the latter being a brace for the block supporting member for the opposite wheel. A notch 28 is formed in the lower edge of the supporting member 22 for engagement by the axle 14 so that the supporting member 22 also acts as a stop to limit axle movement toward the frame.

The block supporting member 24 is rigidly secured to a half collar or pad 30 which in turn is rigidly secured to the axle 14, and the supporting member 24 is braced transversely by an outer gusset 32 and an inner vertical plate 34. The block mounting members 22 and 24 have opposed block mounting faces 35 and 36 respectively which are positioned in space relation longitudinally of the axle 14 and which extend in parallel relation transversely thereto. The rubber blocks 18 and 20 are suitably connected to the block supporting members between the mounting faces thereof as by bolts 38, preferably in transversely spaced relation on either side of the axle as shown in FIG. 1.

When the brake 16 is applied the axle will tend to rotate, which would increase the shear loading of the rubber blocks 18 and 20. To minimize this, reaction means in the form of a pair of members 40 and 41 are secured to the block supporting member 22 and hence to the vehicle frame and extend downwardly between the rubber blocks 18 and 20. Any rotation of the axle 14 will be accompanied by movement of the outer block supporting member 24 and by movement of the reinforcing plate 34 secured thereto which extends radially of the axle and is employed as an arm to which braking bumpers 42 and 43 are secured for engagement with the reaction members 40 and 41. These reaction means will of course not be needed on a simple axle where no brake is fitted.

Fore and aft placement of the axle is provided by a link 44 pivotally secured to a bracket 45 carried by the frame and to the axle 14, the connection at the axle being preferably made through a crank 46 secured to the axle so that the link 44 resists rotational as well as fore and aft axle movement.

The construction offers several important advantages over a conventional spring suspension, particularly for trucks and trailers. Initial cost of the present construction is lower especially when compared with a conventional construction employing both main and helper springs, maintenance will be lower, and operation more quiet.

While preferred embodiments have been described above in detail, it will be understood that numerous modifications might be resorted to without departing from the scope of the invention as defined in the following claims.

I claim:
1. A suspension for connecting a wheel and axle to a vehicle frame comprising
   (a) a pad rigidly secured to the axle,
   (b) an upstanding plate rigidly secured to the pad and extending transversely of the axle toward the frame,
   (c) a depending plate rigidly secured to the frame and extending toward the axle in parallel spaced relation to the upstanding plate.
   (d) an arm rigidly secured to the pad and to the upstanding plate and extending toward the depending plate in radial relation to the axle and in perpendicular relation to the upstanding plate,
   (e) resilient rubber blocks secured to and located between said plates on either side of said arm whereby the rubber blocks act in compression to position the axle transversely of the frame and act in shear to absorb the vehicle load and road shocks, and (f) a pair of reaction members rigidly secured to the depending plate on either side of said arm for engagement thereby upon rotational movement of the axle to minimize any shear loading of the rubber blocks due to such axle movement.

2. A suspension as claimed in claim 1 further comprising a link pivotally connected between the frame and the axle to further minimize any shear loading of the rubber blocks due to rotational or to fore and aft movement of the axle.

References Cited by the Examiner

UNITED STATES PATENTS

| 2,706,113 | 4/1955 | Hickman | 267—21 |
| 2,830,826 | 4/1958 | Albrecht et al. | 280—124 X |
| 3,017,195 | 1/1962 | Hickman | 280—124 X |

FOREIGN PATENTS

| 488,888 | 7/1938 | Great Britain. |
| 496,035 | 11/1938 | Great Britain. |

A. HARRY LEVY, *Primary Examiner.*

LEO FRIAGLIA, *Examiner.*